June 24, 1941. L. H. GARLINGHOUSE 2,247,083
WHEELBARROW CHASSIS AND BODY CONSTRUCTION
Filed May 13, 1940 2 Sheets-Sheet 2
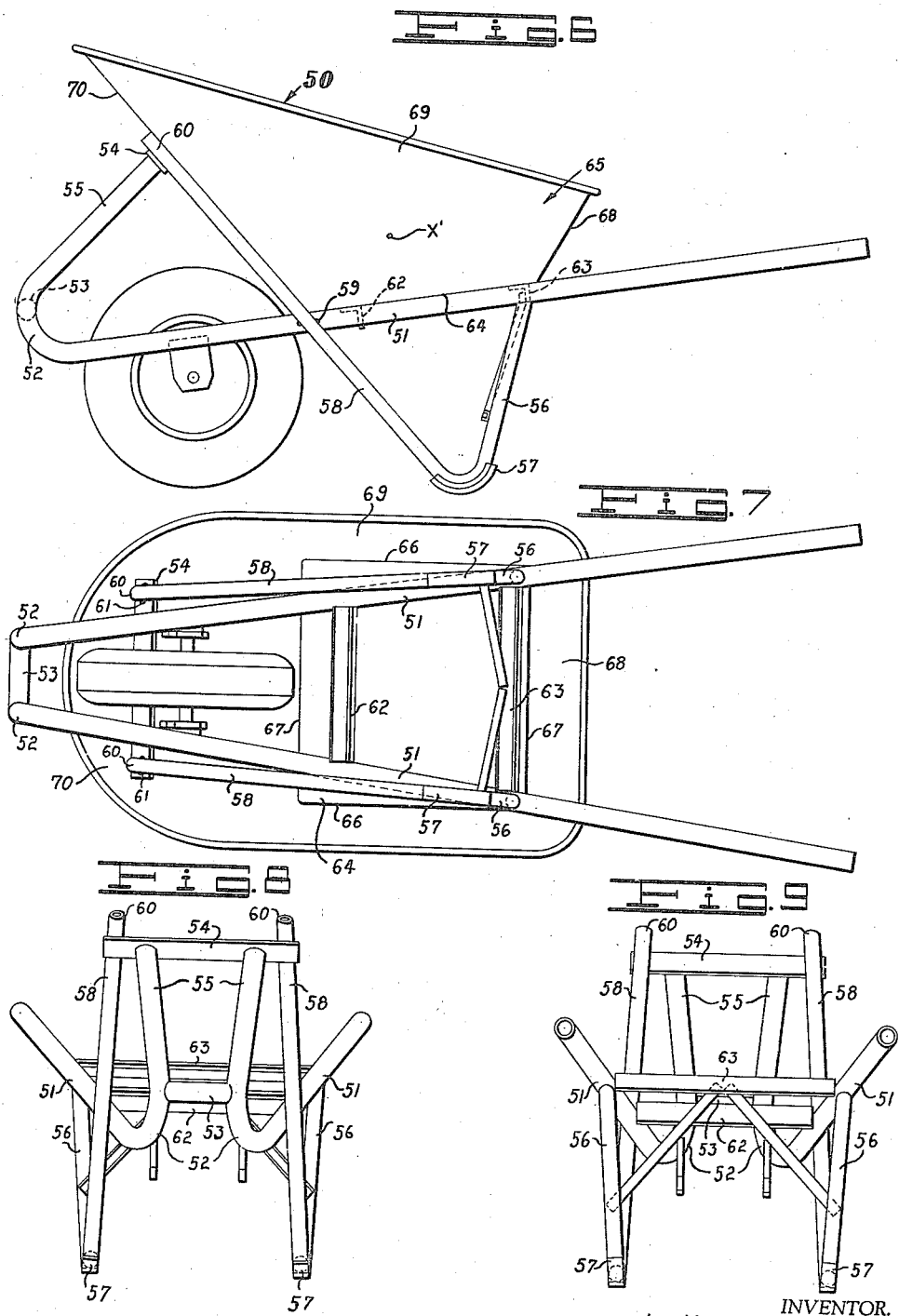
INVENTOR.
L. H. GARLINGHOUSE
BY
ATTORNEY.

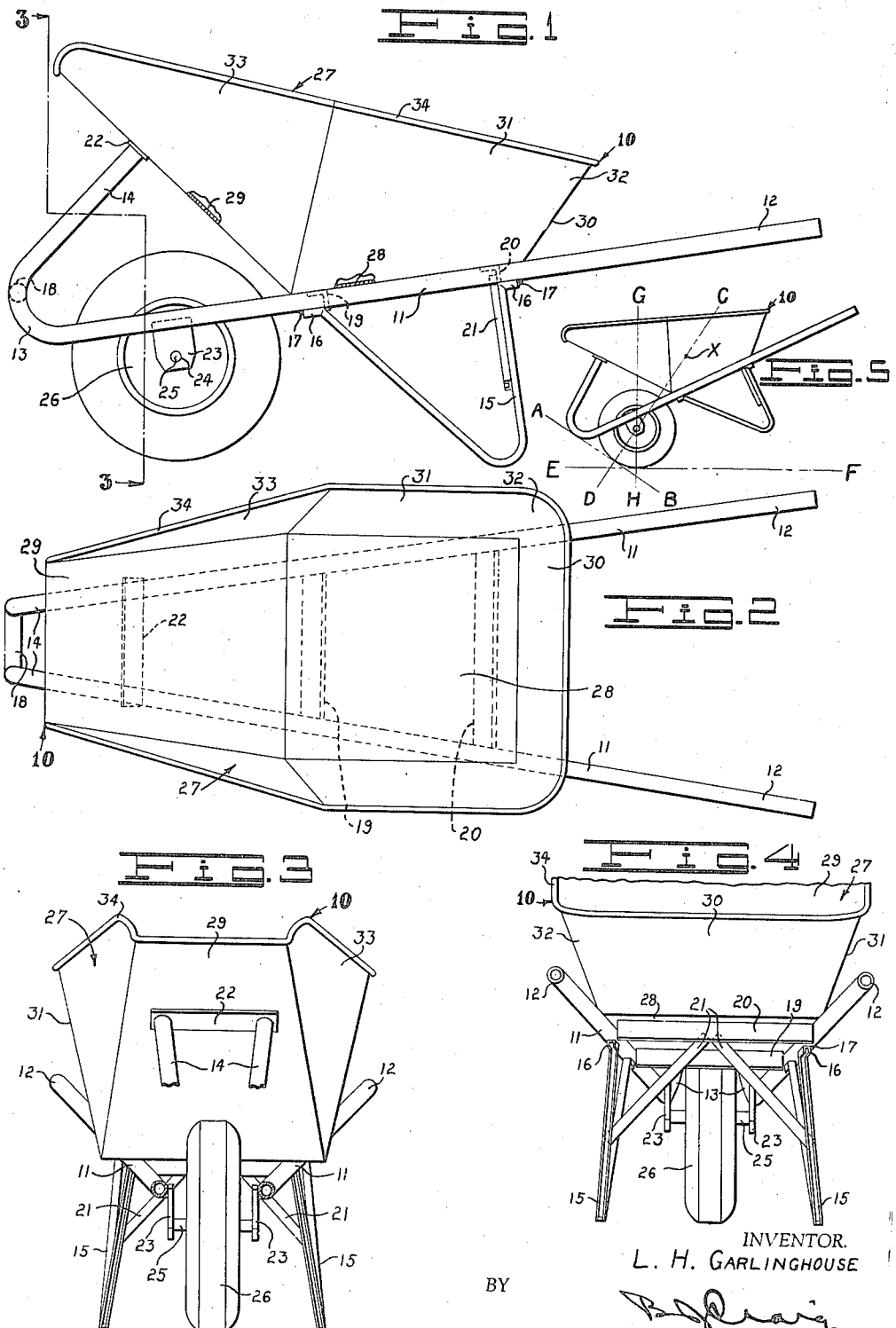

Patented June 24, 1941

2,247,083

UNITED STATES PATENT OFFICE 2,247,083

WHEELBARROW CHASSIS AND BODY CONSTRUCTION

Leslie H. Garlinghouse, Los Angeles, Calif.

Application May 13, 1940, Serial No. 334,825

1 Claim. (Cl. 280—52)

This invention relates to a wheelbarrow frame and body construction.

The general object of the invention is to provide a novel wheelbarrow which can be operated with a minimum of effort.

A more specific object of the invention is to provide a novel wheelbarrow chassis.

A further object of the invention is to provide a wheelbarrow including a chassis having a novel nose portion thereon.

Another object of the invention is to provide a wheelbarrow including a chassis including a novel body.

A further object of my invention is to provide a wheelbarrow including a novel body and chassis which are so constructed and arranged that easy dumping is secured when the wheelbarrow is in use.

Other objects and the advantages of this invention will be apparent from the following description taken in connection with the accompanying drawings, wherein:

Fig. 1 is a side elevation of a wheelbarrow embodying the features of my invention;

Fig. 2 is a top plan view of the wheelbarrow;

Fig. 3 is a section taken on line 3—3, Fig. 1;

Fig. 4 is a fragmentary rear elevation;

Fig. 5 is a diagram showing the dumping and wheeling positions;

Fig. 6 is a view similar to Fig. 1 showing a modification;

Fig. 7 is a bottom plan view of the modification;

Fig. 8 is an elevation of the chassis looking rearwardly; and

Fig. 9 is a view similar to Fig. 8 looking forwardly.

Referring to the drawings by reference characters I have shown my invention as embodied in a wheelbarrow which is indicated generally at 10. As shown the wheelbarrow 10 includes a pair of tubular metal downwardly and forwardly inclined side members 11 which have gripping portions 12 at one end and at the other end include curved nose portions 13 from which upwardly extending portions 14 project.

Each side member is engaged by a leg member 15 which is of general V-shape and is inclined. The leg members are held in place by end members 16 which may be welded as at 17 to the side members.

The side members converge forwardly and at the curved portions 13 are connected by a cross member 18 suitably welded in place.

The side members 11 are connected by front and rear cross members 19 and 20 which are suitably welded in place.

Brace members 21 (see Fig. 4) are secured to the cross member 20 at their upper ends and at their lower ends engage the leg members 15 to brace the latter.

The upwardly extending portions 14 are connected by a transverse member 22 (see Fig. 3).

Each side member is provided near the front end thereof with a downwardly directed ear 23 which is suitably welded in place. The ears 23 are provided with apertures 24 which suitably support an axle 25 which in turn supports a wheel 26.

The side members 11 and their associated parts provide a chassis and on this chassis I mount a body or tray 27. This tray 27 includes a bottom 28 which is planar and which engages the side members 11 and is suitably secured thereto. The tray includes an inclined front end portion 29 which is planar and which engages the transverse member 22. The edges of the bottom 28 preferably form a rectangle while the sides of the front 29 converge forwardly.

The tray 27 is provided with a rear end 30 joined to rear sides 31 by a curved portion 32. The tray also includes front sides 33 which are planar and the tray further includes an upper rim 34.

The nose portion 13 projects forwardly beyond the tray and the axis of the shaft 25 and the construction of the tray is such that the center of gravity is low so that most of the load is placed on the wheel. Also the relation between the location of the wheel, the dumping nose and the center of gravity of a struck load in the tray is such that when the handles are raised about chest high the nose of the frame strikes the ground and the center of gravity of the load is in the vertical plane which passes through the wheel axle. This arrangement affords an easy dumping wheelbarrow.

In Fig. 5 the arrangement is shown diagrammatically wherein the wheelbarrow 10 assumes the dumping position along the ground line A—B with the nose 13 contacting the ground and in this position it will be noted that the center of gravity X is in the line C—D which is vertical to A—B. In wheeling position the ground line is approximately at E—F and it will be noted that the center of gravity X is in the rear of the line G—H which is perpendicular to the wheeling ground line E—F.

In Figs. 6 to 9, inclusive, I show a modification of my invention wherein the wheelbarrow indicated generally at 50 includes side members 51 having a nose portion 52, a nose cross member 53, a transverse member 54 which connects upwardly extending portions 55 which are continuations of the nose member 52. Each side member is engaged by a leg 56 which has a wear plate 57 thereon and which includes an upwardly and forwardly extending portion 58 disposed outside of the side member 51 and secured to the side members 51 by welding as at 59.

The portions 58 at their upper end 60 are secured to the transverse member 54 as by welding at 61. The chassis includes a front cross member 62 which engages the bottom 64 of a tray or body 65. The tray bottom has parallel side edges 66 and parallel end edges 67. The tray includes a rear 68, sides 69 and front 70.

The center of gravity of the tray with a struck load therein is at a point X which like the construction previously described is in the rear of the vertical plane passing through the rear axis when the wheelbarrow is in wheeling position. Also like the construction previously described when the nose 52 touches the ground the center of gravity X' is in the vertical plane which passes through the rear axle, so that ease of handling is secured.

From the foregoing it will be apparent that I have invented a novel wheelbarrow which can be economically manufactured and which is strong in construction and with which loads can be handled with a minimum of labor effort.

Having thus described my invention, I claim:

In a wheelbarrow, a chassis including a pair of hollow, elongated, side members each having a curved nose portion at the front thereof and having a grip portion at the rear and an upwardly directed, rearwardly extending, portion on each of said nose portions, the axis of each side member being in a single plane, a nose cross member connected to the ends of said nose portions and connecting said nose portions, said side members converging forwardly, a front cross member and a rear cross member connecting said side members, each of said front and rear cross members comprising an angle member having one leg arranged perpendicular to the axes of the side members and having the other leg parallel to the plane intersecting the axes of said side members, the other leg having its top surface flush with the top of the side members, a supporting leg mounted on each of said side members, a wheel mounted on said side members, a tray having a planar bottom engaging the top of said side members and the top of said front and rear cross members, said tray including a planar inclined front portion engaging said nose cross member, said tray front portion projecting beyond said wheel, said tray being disposed on said chassis so that with a struck load in the tray, when the wheelbarrow is swung so that the nose portions strike the ground, the center of gravity is in the vertical plane which extends transverse of the tray and passes through the wheel axle and when the wheelbarrow is in wheeling position the center of gravity is in the rear of the vertical plane which extends transverse of the tray and passes through the wheel axle.

LESLIE H. GARLINGHOUSE.